(12) United States Patent
Takeshima et al.

(10) Patent No.: US 7,792,382 B2
(45) Date of Patent: Sep. 7, 2010

(54) METHOD AND APPARATUS FOR FILTERING, CLUSTERING, AND REGION FITTING BY MEAN SHIFT OF IMAGES USING KERNEL FUNCTION VALUES

(75) Inventors: Hidenori Takeshima, Ebina (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 838 days.

(21) Appl. No.: 11/689,857

(22) Filed: Mar. 22, 2007

(65) Prior Publication Data

US 2008/0013784 A1    Jan. 17, 2008

(30) Foreign Application Priority Data

Jul. 13, 2006    (JP) .............................. 2006-193100

(51) Int. Cl.
   *G06K 9/40*    (2006.01)
(52) U.S. Cl. ...................... 382/260; 382/274; 382/275
(58) Field of Classification Search .................. 382/260, 382/274, 275, 282
   See application file for complete search history.

(56) References Cited

U.S. PATENT DOCUMENTS

| | | | |
|---|---|---|---|
| 5,479,270 A * | 12/1995 | Taylor ......................... | 358/488 |
| 5,568,208 A * | 10/1996 | Van de Velde .............. | 351/221 |
| 6,055,335 A | 4/2000 | Ida et al. | |
| 6,275,615 B1 | 8/2001 | Ida et al. | |
| 7,079,977 B2 * | 7/2006 | Osorio et al. ............... | 702/176 |
| 7,174,206 B2 * | 2/2007 | Frei et al. .................... | 600/544 |
| 2005/0111739 A1 | 5/2005 | Ida et al. | |
| 2005/0117804 A1 | 6/2005 | Ida et al. | |
| 2006/0221090 A1 | 10/2006 | Takeshima et al. | |

OTHER PUBLICATIONS

U.S. Appl. No. 09/692,457, filed Oct. 20, 2000, Takashi Ida, et al.
Dorin Comaniciu, et al., "Mean Shift: A Robust Approach Toward Feature Space Analysis", IEEE Transactions on Pattern Analysis and Machine Intelligence, May 2002, vol. 24, No. 5, pp. 603-619.
Yuri Y. Boykov, et al., "Interactive Graph Cuts for Optimal Boundary & Region Segmentation of Objects in N-D Images", IEEE Eighth International Conference of Computer Vision, 2001, vol. 1, pp. 105-112.
Hidenori Takeshima, et al., "Extracting Object Regions Using Locally Estimated Color Distributions", Gazou—No Ninshiki-Rikai Symposium (MIRU2066), Jul. 2006, pp. 334-339, With English Abstract.
U.S. Appl. No. 12/398,742, filed Mar. 5, 2009, Ida, et al.

* cited by examiner

*Primary Examiner*—Yosef Kassa
(74) *Attorney, Agent, or Firm*—Oblon, Spivak, McClelland, Maier & Neustadt, L.L.P.

(57) ABSTRACT

A path connecting a target sample of an arbitrary N-dimensional vector to a plurality of candidate samples in a sample set in an N-dimensional space having γ-dimensional positions and an η-dimensional feature quantity is set. On the path, the feature quantity is integrated to obtain an integration value. Using the integration value as a variable value of a preset kernel function, a kernel function value corresponding to the target sample is calculated.

17 Claims, 11 Drawing Sheets

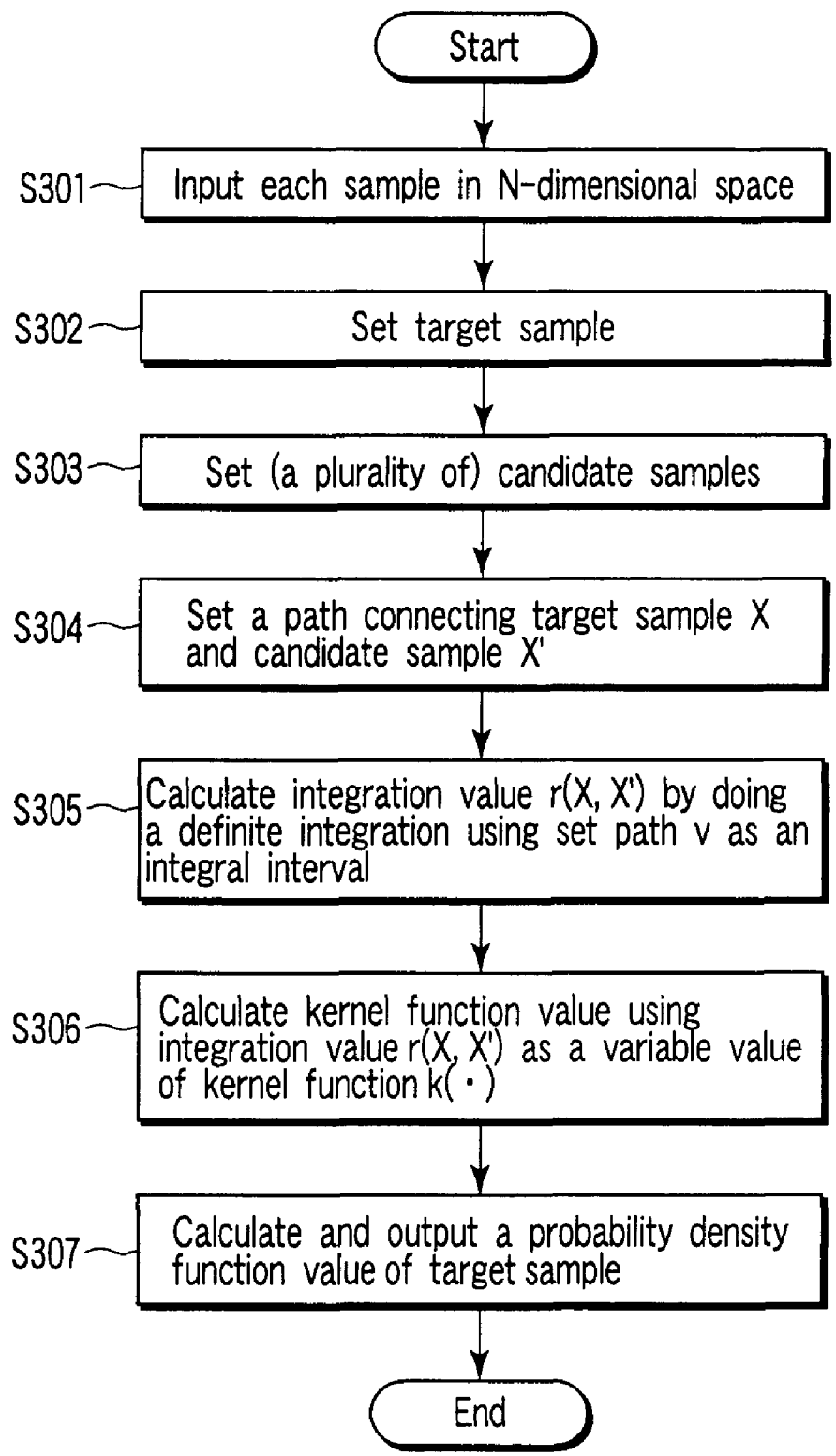
F I G. 20

METHOD AND APPARATUS FOR FILTERING, CLUSTERING, AND REGION FITTING BY MEAN SHIFT OF IMAGES USING KERNEL FUNCTION VALUES

CROSS-REFERENCE TO RELATED APPLICATIONS

This application is based upon and claims the benefit of priority from prior Japanese Patent Application No. 2006-193100, filed Jul. 13, 2006, the entire contents of which are incorporated herein by reference.

BACKGROUND OF THE INVENTION

1. Field of the Invention

This invention relates to a method and apparatus for filtering, clustering, and region fitting by a mean shift of images using kernel function values.

2. Description of the Related Art

One known clustering method of dividing samples scattered in an object space, such as an image space, into clusters having a uniform feature quantity mean shift is disclosed in D. Comaniciu, et al., "Mean Shift: A Robust Approach Toward Feature Space Analysis," IEEE Trans. Pattern Analysis and Machine Intelligence, Vol. 24, no. 5, May 2002. Mean shift is the approach of replacing the feature quantity of a target sample with the average of the feature quantities of the individual samples in the kernel. In this document, a circle with a specific radius having a target sample in the center and a spherical or oval fixed kernel are used. Mean shift is realized by estimating a probability density function for a plurality of samples scattered in an object space (which is generally referred to as kernel density estimation) and finding a local maximum position of the gradient of the estimated probability density function.

Kernel density estimation has been described in, for example, B. W. Silverman, "Density Estimation for Statistics and Data Analysis," Chapman & Hall/CRC, ISBN 0-412-24620-1, 1986, pp. 13-15 and pp. 75-76. An example of the kernel function has been shown on p. 43 of the document. A kernel function and a profile act as weighting values for each sample in kernel density estimation or mean shift.

Clustering can be realized by allocating a cluster to each local maximum position of the probability density function obtained by kernel density estimation. Specifically, mean shift is repeated using each sample in an object space as a target sample, thereby causing the feature quantity of each sample in a cluster to converge at a typical feature quantity in the cluster. After the convergence, a cluster is allocated to each part having a single feature quantity. For an object space where a suitable distance or a parameter conforming to the distance has been defined, such clustering can be possible. When the object space is an image space, the operation of applying clustering to positions and feature quantities (e.g., luminance vectors or color signal value vectors, such as RGB) is also referred to as region segmentation.

In mean shift, a target sample is moved to the mean position of the feature quantities. If the samples in the object space are distributed uniformly, such a movement does not take place. When the object space is a three-dimensional image space defined by two-dimensional positions (x-coordinate and y-coordinate) and a one-dimensional feature quantity (luminance), clustering is possible by mean shift, provided that each pixel is regarded as a sample in the image space. At this time, if there is a single region composed of a plurality of such partial regions as each allow a plurality of fixed kernels to fit in, for example, the image, a convergent point is created for each partial region in mean shift using a fixed kernel. As a result, a plurality of clusters are allocated to a single region (which is referred to as excessive segmentation). This goes against the clustering's purpose of allocating one cluster to a region that can be regarded as a single. If the radius of the kernel is made larger, a plurality of clusters are less liable to be allocated to a single region.

Consider a case where there are a plurality of sample sets in the object space and clusters are expected to be allocated to the individual sample sets. At this time, if the radius of the kernel is small, the samples in each sample set converge in one place as a result of mean shift and a cluster is allocated to each set. However, when the radius of the kernel is too large, all of the samples converge in one place by mean shift. As a result, a plurality of clusters to be divided are integrated into a unity (which referred to as excessive integration).

More specifically, consider a case where, for example, a pattern with the correct outline is prepared for image retrieval and a region boundary which coincides with an edge pattern is searched for by generalized Hough transform (refer to, for example, D. H. Ballard, Generalizing the Hough Transform to Detect Arbitrary Shapes, Pattern Recognition 1981, vol. 13, no. 2, pp. 111-122). At this time, the following problem arises: if the region boundaries are lost (excessive integration), the detection of the object fails and, if there is an unnecessary region boundary (excessive segmentation), a thing that is not an object is detected erroneously.

BRIEF SUMMARY OF THE INVENTION

According to a first aspect of the invention, there is provided an image filtering method comprising: setting a path connecting a first pixel of an arbitrary N-dimensional vector (N is a natural number) to a plurality of second pixels in an N-dimensional space having $\gamma$-dimensional positions and an $\eta$-dimensional feature quantity ($\gamma$ is a natural number equal to 2 or more and $\eta$ is a natural number equal to 1 or more); obtaining an integration value by integrating the feature quantity on the path; calculating a kernel function value corresponding to the first pixel using the integration value as a variable value of a preset kernel function; calculating a mean shift vector by dividing the sum of products of the kernel function value and the feature quantities of the second pixels by the sum total of the kernel function values; moving the first pixel according to the mean shift vector; and replacing the feature quantity of the first pixel with the feature quantity of the moved first pixel.

According to a second aspect of the invention, there is provided an image clustering method comprising: setting a path connecting a first pixel of an arbitrary N-dimensional vector (N is a natural number) to a plurality of second pixels in an N-dimensional space having $\gamma$-dimensional positions and an $\eta$-dimensional feature quantity ($\gamma$ is a natural number equal to 2 or more and $\eta$ is a natural number equal to 1 or more); obtaining an integration value by integrating the feature quantity on the path; calculating a kernel function value corresponding to the first pixel using the integration value as a variable value of a preset kernel function; calculating a mean shift vector by dividing the sum of products of the kernel function value and the feature quantities of the second pixels by the sum total of the kernel function values; moving the first pixel according to the mean shift vector; replacing the feature quantity of the first pixel with the feature quantity of the moved first pixel; and allocating the same cluster to a plurality of pixels whose similarity of feature quantity is equal to or higher than a predetermined threshold value among the moved first pixels.

According to a third aspect of the invention, there is provided an image region fitting method comprising: obtaining an image composed of a plurality of pixels having two-dimensional positions and a one-dimensional feature quantity; setting an initial first region and an initial second region schematically showing a subject region and a background region respectively in the image; setting a path connecting a first pixel of an arbitrary N-dimensional vector (N is a natural number) to a plurality of second pixels in the image; obtaining an integration value by integrating the feature quantity on the path; calculating a kernel function value corresponding to the first pixel using the integration value as a variable value of a preset kernel function; obtaining a first probability density function value by adding a first kernel function value at each pixel belonging to the initial first region among the kernel function values; obtaining a second probability density function value by adding a second kernel function value at each pixel belonging to the initial second region among the kernel function values; comparing the first probability density function value and the second probability density function value and obtaining region information indicating which of the subject region and background region a target pixel set to a pixel in at least a part of the image belongs to; and outputting the region information.

According to a fourth aspect of the invention, there is provided an image mean shift filter comprising: a setting section which sets a path connecting a first pixel of an arbitrary N-dimensional vector (N is a natural number) to a plurality of second pixels in an N-dimensional space having $\gamma$-dimensional positions and an $\eta$-dimensional feature quantity ($\gamma$ is a natural number equal to 2 or more and $\eta$ is a natural number equal to 1 or more); an integrating section which obtains an integration value by integrating the feature quantity on the path; a first computing section which calculates a kernel function value corresponding to the first pixel using the integration value as a variable value of a preset kernel function; an extracting section which extracts the feature quantities of the second pixels; a storage section which stores the feature quantity; a second computing section which calculates a mean shift vector by dividing the sum of products of the kernel function value and each of the feature quantities of the second pixels by the sum total of the kernel function values; and a replacing section which moves the first pixel according to the mean shift vector and replaces the feature quantity of the first pixel with the feature quantity of the moved first pixel.

According to a fifth aspect of the invention, there is provided a region fitting apparatus comprising: an obtaining section which obtains an image composed of a plurality of pixels having two-dimensional positions and a one-dimensional feature quantity; a first setting section which sets an initial first region and an initial second region schematically showing a subject region and a background region respectively in the image; a second setting section which sets a path connecting a first pixel of an arbitrary N-dimensional vector (N is a natural number) to a plurality of second pixels in the image; an integrating section which obtains an integration value by integrating the feature quantity on the path; a first computing section which calculates a kernel function value corresponding to the first pixel using the integration value as a variable value of a preset kernel function; a first adding section which obtains a first probability density function value by adding a first kernel function value at each pixel belonging to the initial first region schematically showing the subject region of the image among the kernel function values; a second adding section which obtains a second probability density function value by adding a second kernel function value at each pixel belonging to the initial second region schematically showing the background region of the image among the kernel function values; a comparing section which compares the first probability density function value and the second probability density function value and obtains region information indicating which of the subject region and background region a target pixel set to a pixel in at least a part of the image belongs to; and an output section which outputs the region information.

BRIEF DESCRIPTION OF THE SEVERAL VIEWS OF THE DRAWING

FIG. 20 is a flowchart to help explain the processing sequence in the apparatus of FIG. 19;

DETAILED DESCRIPTION OF THE INVENTION

Hereinafter, referring to the accompanying drawings, embodiments of the invention will be explained. In the explanation below, the calculation of kernel function values (or the determination of kernel shape) will be described first and then mean shift (or mean shift filter), kernel density estimation (or estimation of probability density function), and region fitting will be described in that order. The processes explained below can be carried out by software using a computer. That is, programs which cause the computer to carry out the processes below can be provided.

<Computing Kernel Function Values>

Figure 1:
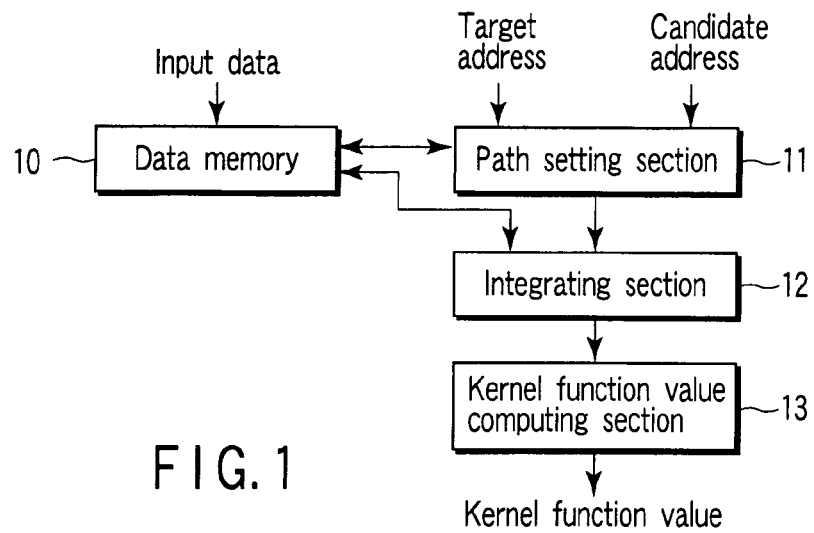
FIG. 1 is a block diagram of a kernel function value computing apparatus according to a first embodiment.

In FIG. 1, a kernel function computing apparatus according to a first embodiment comprises a data memory 10, a path setting section 11, an integrating section 12, and a kernel function computing section 13. The kernel function value computing apparatus calculates kernel function values corresponding to a plurality of candidate samples in a sample set in an N-dimensional space having γ-dimensional positions and η-dimensional feature quantities (γ, η, and N are natural numbers). While a fixed shape, such as a circle, a sphere, or an ellipse, was used in a conventional equivalent, the shape of a kernel is determined adaptively according to the samples scattered in the space on the basis of a predetermined reference in the embodiment. Determining the shape of a kernel corresponds to finding kernel function values for the individual candidate samples (or weighting values given to the candidate samples) in the N-dimensional space in the embodiment.

Figure 2:
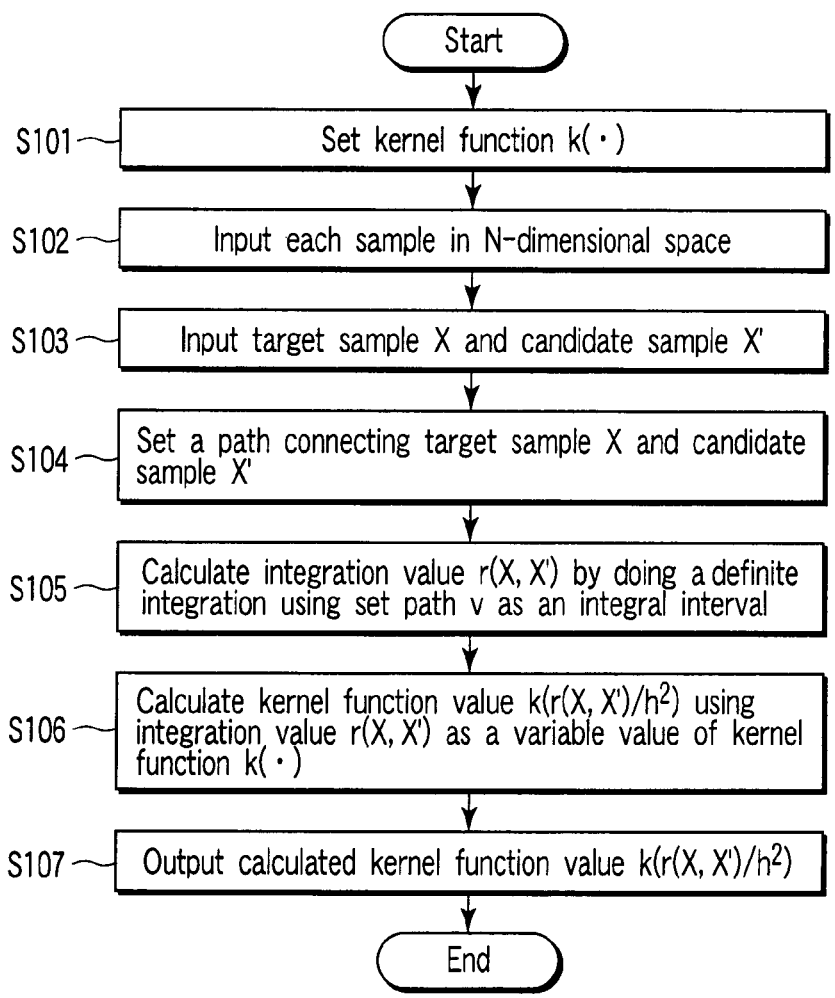
FIG. 2 is a flowchart to help explain the processing sequence in the apparatus of FIG. 1.

Next, using FIG. 2, the sequence of calculating a kernel function value will be explained. The flowchart of FIG. 2 shows the flow of an algorithm for calculating a kernel function value when an arbitrary target sample in an N-dimensional space (the sample may be nonexistent in the space) and a plurality of candidate samples (these are samples present in the space) are input. The N-dimensional space is not limited to this. For instance, it may be a three-dimensional image space. In the case of an image space, samples are pixels. The image space has two-dimensional positions x, y and a one-dimensional feature quantity (luminance I(x, y)).

First, a kernel function k(•) is set in advance (step S101). A profile, the differentiation of a kernel function, is a kind of kernel function. The kernel function may be fixed in advance or be selectable. For example, in a computer program, if a pointer for a subroutine that, when a vector is input, returns a kernel function value is input, it is easy to select a kernel function in calculating a kernel function value. Specifically, a kernel function outputs a normal distribution function or such a function as, if the variable value exceeds a predetermined value, outputs 0 and, if not, outputs a predetermined constant.

After the kernel function k(•) has been set in step S101, a sample set in the N-dimensional space is input and each sample (sample data) in the sample set is stored in the data memory 10 (step S102).

Next, a target sample X composed of an N-dimensional vector and a candidate sample X' composed of an N-dimensional vector are input (S103). The candidate sample X' is one sample in the sample set stored in the data memory 10. Therefore, in step S103, a candidate sample address indicating the storage location of the candidate sample X' in the data memory 10 may be input. Alternatively, the vector of the candidate sample may be input. When the target sample X is one sample in the sample set stored in the data memory 10, the target sample address indicating the storage location of the target sample X in the data memory 10 may be input in step S103. Alternatively, the vector of the target sample may be input.

The target sample X and candidate sample X' input in step S103 are supplied to the pass setting section 11. The pass setting section 11 sets a path connecting the target sample X and candidate sample X' (S104). The pass setting section 11 sets the path, referring to the sample data in the data memory 10 as needed.

The path set in step S104 is supplied to the integrating section 12. The integrating section 12 does a definite integration of the feature quantity of the sample (e.g., luminance when the sample data is image) using the set path as an integral interval, referring to the sample data in the data memory 10, thereby calculating an integration value r(X, X') (step S105). The integration value r(X, X') is given by the following equation:

$$r(X, X') = \int_X^{X'} R(I(v))dv \quad (1)$$

where R(I(v)) is a function for determining whether to include the feature quantity of the sample being scanned in the kernel corresponding to the target sample X. A concrete shape of R(I(v)) will be described in detail in an embodiment related to mean shift explained later. Here, X and X' are vectors and the integral sign in equation (1) is line integral.

Finally, using the integration value r(X, X') as a variable value of the kernel function k(•), the kernel function value computing section 13 calculates a kernel function value k(r(X, X')/h$^2$) corresponding to the target sample X (step S106) and outputs the kernel function value k(r(X, X')/h$^2$) (step S107). Here, h corresponds to the radius in mean shift and is a predetermined value. The above-described processing is done on each target sample in the sample set in the N-dimensional space, thereby calculating each kernel function value, which enables the kernel shape to be determined. The way the kernel shape is set will be explained in detail later.

The method of representing a position in the image space is not limited to x and y in two dimensions. For instance, the method may be used in three dimensions (time-space images) using x, y, and time t, in three dimensions using x, y, and depth z, or in four dimensions using x, y, z, and t. The feature quantity is not limited to one-dimensional luminance. For example, it may be the color of a color image or the amount of X-ray detected in an X-ray image. The color space representing the color of a color image is arbitrary. For example, an RGB space, an L*a*b* space, an L*u*u* space, or a CMYK space may be used as the color space. Moreover, the feature quantity representing texture (e.g., an auto-correlation coefficient, a wavelet coefficient, or a Gabor wavelet coefficient found for each point) may be used as the feature quantity. When η is 2 or more, the feature quantity I(x, y) in the embodiment is treated as a vector and the same equation is used, unless otherwise noted. In this case, R(I(v)) is treated as a function that outputs a one-dimensional value corresponding to an η-dimensional value.

The kernel function value computing apparatus of FIG. 1 and the sequence of FIG. 2 can be applied to mean shift and kernel density estimation described later. If a hardware that realizes the kernel function value computing apparatus of FIG. 1 and a program conforming to the flowchart of FIG. 2 are designed in advance, they can be used for mean shift or kernel density estimation, which helps save development costs.

<Region Segmentation Using Mean Shift>

Next, as an application of the above-described kernel function value calculation, an embodiment which performs a region segmentation of an image using mean shift will be explained. First, a problem in fixing the shape of a kernel will be described, followed by the description of a method of determining the shape of a kernel in applying the invention to region segmentation. Then, the procedure for region segmentation will be described.

Figure 3:
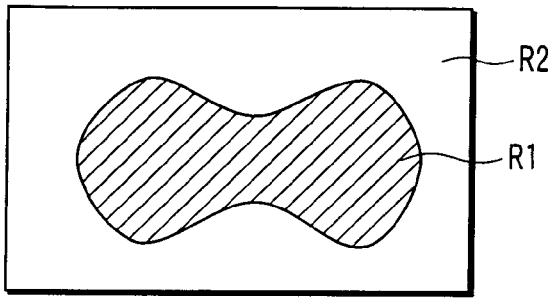
FIG. 3 shows an image where a region having a certain color exists in the background.
Figure 4:
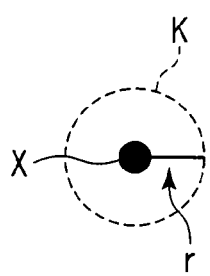
FIG. 4 is a diagram to help explain a circular kernel.
Figure 5:
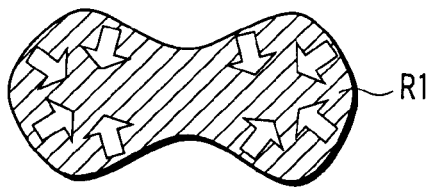
FIG. 5 shows a mean shift vector when a circular kernel of FIG. 4 is used for the image of FIG. 3.
Figure 6:
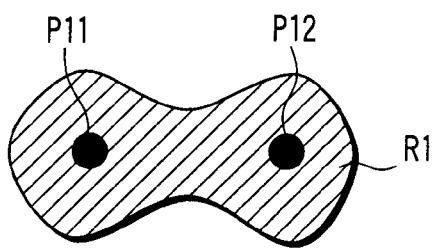
FIG. 6 shows the way a plurality of convergent points are formed according to the mean shift vector of FIG. 5.

As described above, an image can be regarded as a sample set in a three-dimensional space having two-dimensional positions x and y and a one-dimensional feature quantity (luminance I(x, y)). Consider an image where region R1 of a sample set having a certain color exists in background R2 having another color as shown in FIG. 3. When the image of FIG. 3 is subjected to mean shift using a circular kernel K as shown in FIG. 4 as described in D. Comaniciu, et al., "Mean Shift: A Robust Approach Toward Feature Space Analysis," IEEE Trans. Pattern Analysis and Machine Intelligence, Vol. 24, no. 5, May 2002, a point in the kernel K moves along a mean shift vector shown by an arrow in FIG. 5. Specifically, a point in a partial region R11 on the left side of FIG. 5 moves toward the center of R11 and a point in a partial region R12 on the right side moves toward the center of R12. As a result, if the mean shift is repeated, convergent points P11 and P12 are formed for the partial regions R11 and R12, respectively, as shown in FIG. 6. That is, a plurality of convergent points P11, P12 have been formed for the single region R1. Accordingly, when clustering has been done using mean shift, a plurality of clusters are allocated to the single region R1. This is the above-described excessive segmentation, which is an undesirable phenomenon for region segmentation or the clustering of images. It is because the purpose of clustering is to allocate a cluster to a single region. If the radius r of the kernel K shown in FIG. 4 is made larger, such excessive segmentation is less liable to take place.

Figure 7:
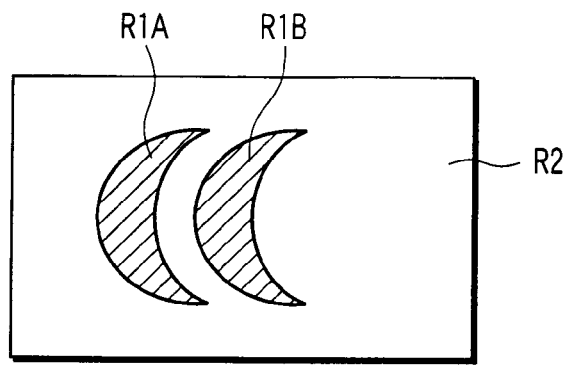
FIG. 7 shows an image where a plurality of regions of sample sets having the same color exist.
Figure 8:
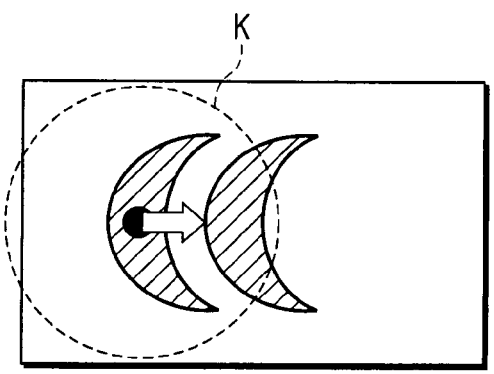
FIG. 8 shows the way a circular kernel with a large radius is used for the image of FIG. 7.
Figure 9:
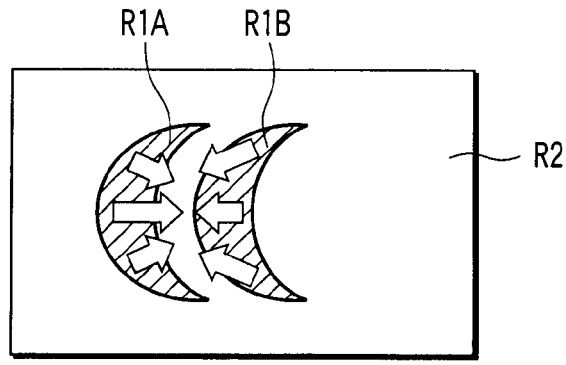
FIG. 9 shows a mean shift vector when the kernel of FIG. 8 is used for the image of FIG. 7.

Here, consider an image where a plurality of regions R1A, R1B in a sample set having, for example, the same color as shown in FIG. 7 exist. In this case, it is expected that the individual regions R1A, R1B will be separated into different clusters by clustering. If the radius r of the kernel K is small, each sample in region R1A and each sample in region R1B converge at different points by mean shift, with the result that separate clusters are allocated to region R1A and region R1B. However, if the radius of the kernel K is too large as shown in FIG. 8, since a mean shift vector is formed as shown by an arrow in FIG. 9, all of the samples converge at one point. As a result, two clusters to be originally separated are integrated into a unity. This is the excessive integration described above.

As described above, the result of the mean shift depends largely on the radius r of the kernel. To overcome this problem, the radius r has to be tuned. The manual tuning of the radius r requires reasonable experience and is a time-consuming job. Moreover, the best radius r differs, depending on the position in the image. Furthermore, for example, when the distribution of samples in the space departs greatly from a circle or a sphere, excessive segmentation and excessive integration may not be suppressed at the same time even if the radius r is set at any value. It is conceivable that a plurality of radii r are tried to select the best radius or that the kernel is caused to have a shape (e.g., ellipse or hyperellipse) other than a circle or a sphere. However, when the distribution of samples departs greatly from the kernel of the previously estimated shape, the problem of permitting at least one of excessive segmentation and excessive integration to take place cannot be solved.

Figure 10:
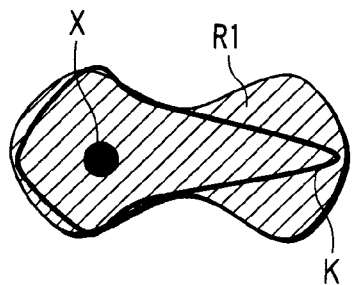
FIG. 10 shows an example of the shape of a kernel formed for the image of FIG. 3 according to the first embodiment.
Figure 11:
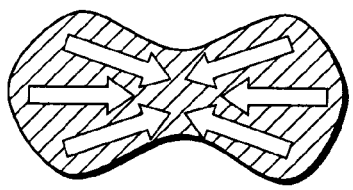
FIG. 11 shows a mean shift vector when a kernel of FIG. 10 is used for the image of FIG. 3.
Figure 12:
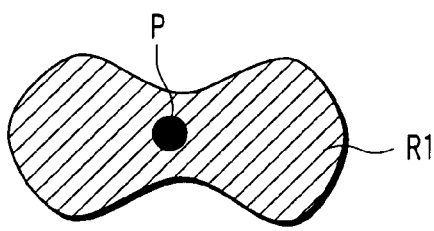
FIG. 12 shows the way a single convergent point is formed in a single region according to the mean shift vector of FIG. 11.

In the embodiment, the shape of the kernel is set to a shape suitable for each position of the kernel without being limited to a specific fixed shape, such as a circle, thereby, for example, expanding the shape of kernel K throughout region R1 as shown in FIG. 10. At this time, the mean shift vectors at all points in region R1 point at the center of kernel K as shown in FIG. 11. Therefore, only one convergent point P is formed in the single region R1 as shown in FIG. 12, causing only one label to be allocated to the convergent point, which makes it possible to avoid the excessive segmentation problem and excessive integration problem.

Figure 13:
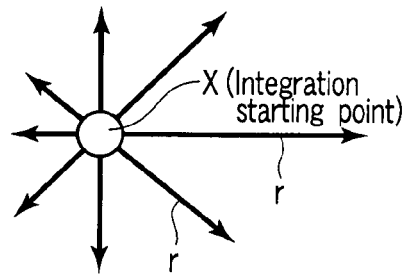
FIG. 13 shows how to search for a region where a candidate sample having the same feature quantity as that of a target sample exists.
Figure 14:
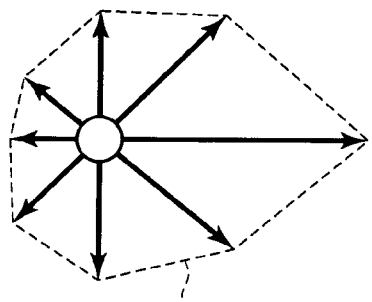
FIG. 14 shows a kernel obtained as a result of the search in FIG. 13.

Hereinafter, a method of expanding the shape of kernel K throughout region R1 as shown in FIG. 10 according to the embodiment will be described. As shown in FIG. 13, for each target sample X, the region of candidate sample X' (referred to as the same feature quantity region) having the same feature quantity as that (e.g., luminance) of the target sample is searched for. The arrows in FIG. 13 show the same feature quantity region in a plurality of directions (eight directions, up, down, left, right, top left, top right, bottom left, and bottom right in FIG. 13) around the target sample X. The length r of the arrow indicates the radius of the same feature quantity region in each direction. Next, the inside of the segments (shown by dot-line arrows) connecting the tips of the same feature quantity region of FIG. 13 as shown in FIG. 14 is set as a kernel. If a kernel, like a Gaussian function, has an infinite length, the kernel function value is caused to become large inside the dot-line arrows of FIG. 14 (or inside the kernel).

A name is given to such a uniform kernel as takes a value of 1 if the value of the function is less than 1 and, if not, takes a value of 0. When k(x) is a uniform kernel, k(x) is called Uniform kernel. In addition, g(x), the differentiation of a kernel function, is a uniform kernel function, g(x) is called an Epanechnikov profile (refer to D. Comaniciu, et al., "Mean Shift: A Robust Approach Toward Feature Space Analysis," IEEE Trans. Pattern Analysis and Machine Intelligence, vol. 24, no. 5, May 2002). Consider a case where g(x), the differentiation of a kernel function used to calculate a mean shift, is an Epanechnikov kernel. At this time, as a method of determining whether a candidate sample X' has the same feature quantity as that of the target sample X, for example, the following method can be used. If the position of the candidate sample is X=(x, y), the feature quantity of the target sample X is I(X), and the feature quantity of the candidate sample X' is I(X'), consider a path v from the target X to the candidate sample X'. It is assumed that a candidate sample in the range where the integration value r(X, X') in equation (1) satisfies equation (2) is a sample inside the kernel K:

$$r(X,X')/h^2 < 1 \qquad (2)$$

where h corresponds to the radius in mean shift and takes a predetermined value.

Specifically, equation (2) means that a candidate sample where the value obtained by dividing the integration value r(X, X') by $h^2$ is less than the threshold value (1 in this case) is a sample inside the kernel K. Therefore, using the integration value in equation (1) as a variable value in the kernel function, the shape of the kernel can be determined.

The integration value r(X, X') in equation (1) can be found by integrating the difference (an absolute value difference in this case) between the feature quantity I(X) of the target sample X and the feature quantity I(v) of each sample on the path v as shown, for example, in equation (3):

$$r(X, X') = \int_{X}^{X'} |I(v) - I(X)| dv \quad (3)$$

Let the target sample X be at an integration start point and a candidate sample X' be at an integration end point. If samples to be used in integration exist discretely at regular intervals, equation (3) is transformed into the following equation (4):

$$r(X, X') = \sum_{i=1}^{n} |I(X_i) - I(X)| \quad (4)$$

where $X_i$ (i=1, 2, ..., n) represents a sample on the path v.

When the samples used in integration are not at regular intervals, the difference between I(X) and I(v) may be divided by the distance between samples in equation (3) or the difference between I(X) and I(v) may be normalized using the length of the path v.

As the integration value r(X, X'), a variation in the feature quantity I(v) of a sample on the path v may be used as shown in, for example, equation (5):

$$r(X, X') = \int_{X}^{X'} \left| \frac{\partial}{\partial v} I(v) \right| dv \quad (5)$$

Figure 15:
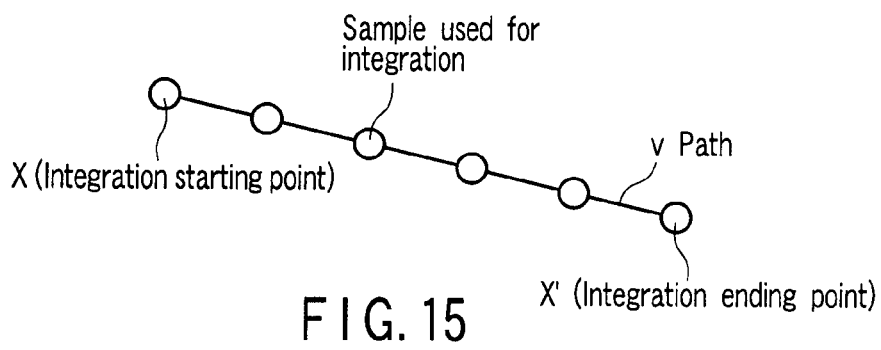
FIG. 15 is a diagram to help explain an integral action for calculating the shape of a kernel according to the first embodiment.

If the samples used in integration on the path v between X and X' exist discretely at regular intervals as shown in FIG. 15, equation (5) is transformed into the following equation:

$$r(X, X') = \sum_{i=2}^{n} |I(X_i) - I(X_{i-1})| \quad (6)$$

If the samples used in integration are not at regular intervals, an equation obtained by dividing a variation in the feature quantity I(v) of a sample on the path v by the interval may be used. Alternatively, a variation in the feature quantity I(v) may be normalized using the length of the path v.

After the shape of the kernel has been determined by the above method, the kernel has a feature quantity close to that of the target sample and is more liable to coincide with a region (a region not including a part to be regarded as another region in the path) connected to the target sample. The advantage of using the above-described method instead of the method of performing just scanning and setting the region fulfilling equation (1) and equation (2) as the inside of the kernel is that resistance to noise can be made higher.

If the kernel function, like a Gaussian function, has an infinite length, r(X, X')/$h^2$ is set as a kernel function value, which makes it possible to increase the kernel function value in a range where it can be determined that the kernel function has the same feature quantity as that of the target sample as in the previous processes using an Epanechnikov profile (a profile that has k(x)=1 if x is less than a specific value and, if not, has k(x)=0.

Region segmentation using a kernel function according to the embodiment can be realized by allocating clusters at the end of a mean shift filter explained later. The details will be described in an explanation of a mean shift filter. The outline of region segmentation is as follows:

Step 1: A mean shift filter is applied to all of the pixels on an image, thereby moving the positions of the pixels in a (γ+η)-dimensional space. At this time, to understand the correspondence between the departure points and destinations of the individual pixels, the departure points are recorded.

Step 2: A memory which holds label values is secured and unknown label values are allocated to all of the moved pixels.

Step 3: One of the moved pixels having unknown label values is selected and a new label value is allocated to the pixel.

Step 4: All of the pixels which are close to the pixel selected in step S3 in the (γ+η)-dimensional space and have unknown label values are searched for and the same label value as that of the pixel selected in step 3 is allocated to them. To search for the pixels close to the pixel selected in step 3, the pixels whose Euclidean distance from the pixel selected in step 3 in the (γ+η)-dimensional space is smaller than the threshold value are searched for.

Step 5: Steps 3 and 4 are repeated until pixels having unknown label values have disappeared.

Step 6: The label images to which label values have been allocated are output to the individual pixels at the corresponding departure points. The reason why the Euclidean distance is compared with the threshold value in step 4 is that, in an actual image, even if the image is expected to converge at the same point, the convergent points do not coincide with one another completely. The distance used in the determination may not be an Euclidean distance (L2 distance). For instance, points whose L1 distance or Ln distance is less than a predetermined threshold value may be regarded as the same point.

Figure 16A:
FIG. 16A shows an example of the original image to be subjected to region segmentation.
Figure 16B:
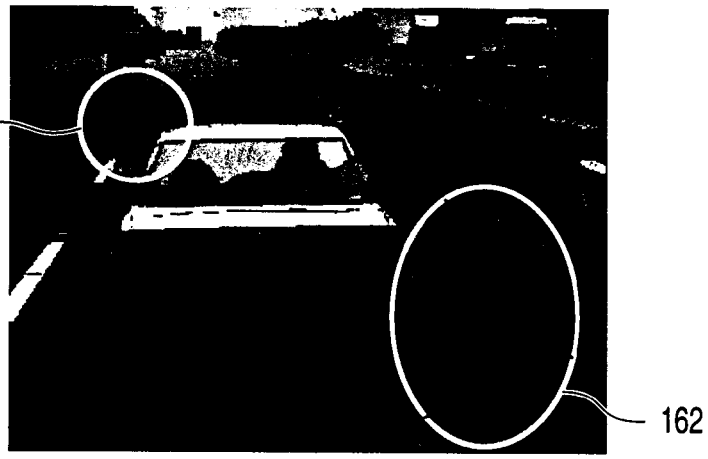
FIG. 16B shows the result of subjecting the image of FIG. 16A to region segmentation by conventional mean shift.
Figure 16C:
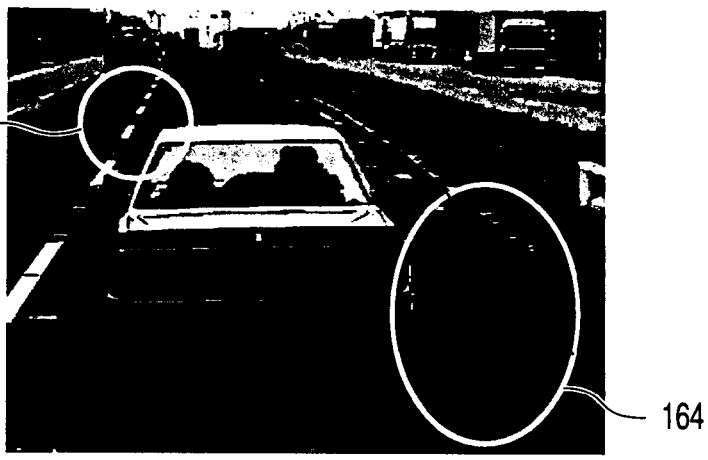
FIG. 16C shows the result of subjecting the image of FIG. 16A to region segmentation by mean shift according to the first embodiment.

Hereinafter, the effect of the above-described region segmentation will be explained. FIG. 16A shows an original image. The image was obtained by photographing a car running on the road from behind. FIG. 16B shows the result of subjecting the image of FIG. 16A to region segmentation by a conventional mean shift. FIG. 16C shows the result of performing region segmentation according to the embodiment. In FIG. 16B, a part of the white line on the road disappears as shown by 161. Moreover, the surface of the road has been segmented unnecessarily as shown by 162. The phenomenon shown by 161 is excessive integration. The phenomenon shown by 162 is excessive segmentation. In contrast, in region segmentation in the embodiment, the white line has not disappeared as shown by 163 in FIG. 16C and excessive integration has been suppressed effectively. In addition, excessive segmentation has also been suppressed.

<Mean Shift Filter>

Figure 17:
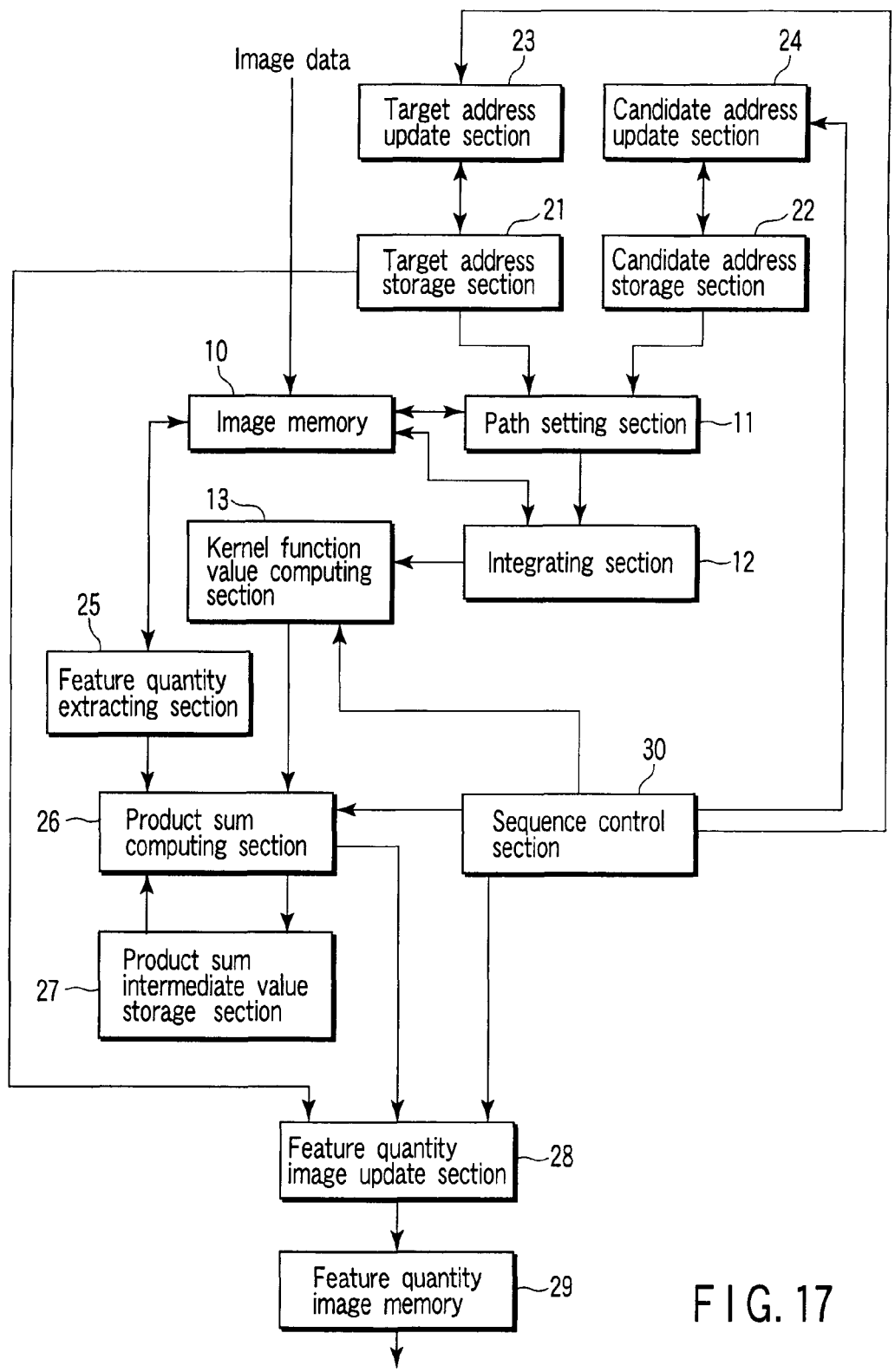
FIG. 17 is a block diagram of a mean shift filter according to a second embodiment.

Next, a mean shift filter using the kernel function value computing sequence described above will be explained. As shown in FIG. 17, the mean shift filter according to an embodiment includes not only the data memory (an image memory in this case) 10, path setting section 11, integrating section 12, and kernel function value computing section 13 which are included in the kernel function value computing apparatus of FIG. 1 but also a target address storage section 21, a candidate address storage section 22, a target address update section 23, a candidate address update section 24, a feature quantity extracting section 25, a product sum computing section 26, a product sum intermediate value storage section 27, a feature quantity image update section 28, a feature quantity image memory 29, and a sequence control section 30. Although the mean shift filter can be applied to a case other than the case where the N-dimensional space is an image space, explanation will be given using a case where an image space is used.

Hereinafter, using FIG. 18, the sequence of carrying out the process of the mean shift filter in a three-dimensional image space (two-dimensional positions and one-dimensional luminance) will be explained. The process of FIG. 17 is controlled by the sequence control section 30.

First, the luminance value of each pixel (sample) in the input image data on a processing object is input and stored in the image memory 10 (step S201). Of the pixels in the input image data, the target image (target sample) to be processed next is set (step S202). Specifically, the begin pixel in the predetermined pixel processing sequence (e.g., raster scan sequence) is determined to be a target pixel. An address indicating the target pixel is set and stored in the target address storage section 21.

Next, weight given to each candidate when a kernel for the target pixel is considered, that is, a kernel function value $g(r(X, X')/h^2)$, is found in steps S203 to S206. First, the address of a candidate pixel whose weight is to be found is set for the target pixel (step S203) and is stored in the candidate address storage section 22. The address of the candidate pixel stored in the candidate address storage section 22 is updated by the candidate update section 24 under the control of the sequence control section 30.

The processes in steps S204 to S206 are the same as those in steps S104 to S106. Specifically, the pass setting section 11 sets a path connecting the target pixel and a candidate pixel (S204). The pass setting section 11 sets the path, referring to the pixel data in the data memory 10 as needed. The path set in step S204 is supplied to the integrating section 12. The integrating section 12 does a definite integration of luminance using the set path as an integral interval, referring to the image data in the image memory 10 as needed, thereby calculating an integration value $r(X, X')$ (step S205). Next, using the integration value $r(X, X')$ as a variable value of the kernel function, the kernel function value computing section 13 calculates a kernel function value $g(r(X, X')/h^2)$ corresponding to the target sample (step S206).

Next, using the kernel function value $g(r(X, X')/h^2)$, a weighted mean is calculated in the kernel, thereby finding a mean shift vector (step S207). Then, according to the mean shift vector, the position of the target pixel is moved (step S208). In other words, in step S208, the position and feature quantity of the target pixel are changed into a weighted mean. This is done by the feature quantity image update section 28 updating the contents of the feature quantity image memory 29. At this time, the feature quantity extracting section 25 extracts the feature quantity of a candidate pixel (e.g., a three-dimensional vector composed of two-dimensional positions and one-dimensional luminance). Referring to the contents of the product sum intermediate value storage section 27, the product sum computing section 26 figures out the sum of products of the feature quantity and the kernel function value $g(r(X, X')/h^2)$ corresponding to each target pixel and divides the product sum by the sum total of the kernel function values corresponding to all the target pixels, thereby determining a mean shift vector.

The processes in steps S203 to S208 are repeated until the sequence control section 30 has determined that they have been repeated a specific number of times. At the time when the processes have been repeated the specific number of times, the moved target pixel obtained last in step S208 is stored (S210). That is, the address of the moved target pixel is stored in the target address storage section 21.

The processes in steps S202 to S210 are repeated in such a manner that the target pixel is shifted to the next pixel until all the pixels have been processed as the target pixel in step S211. The address of the target pixel is stored in the target address storage section 21 and is updated by the target address updating section 23.

The feature quantity of each target pixel is replaced with the feature quantity obtained after the target pixel has been moved in steps S201 to S211, that is, the weighted mean (S212). The obtained feature quantity image is output from the feature quantity image memory 29 (S213). The process in step S212 is carried out by the feature quantity image updating section 28 updating the contents of the feature quantity image memory 29 according to the mean shift vector determined by the product sum computing section 26.

All of the processes in steps S202 to S211 may be repeated without repeating the process in step S209. After the process in step S209 is repeated, all of the processes in steps S202 to S211 may be repeated. While in the embodiment, the destination of the target pixel has been found using the position or pixel value before each target pixel moves, the position and pixel value the moved target pixel may be used.

Figure 18:
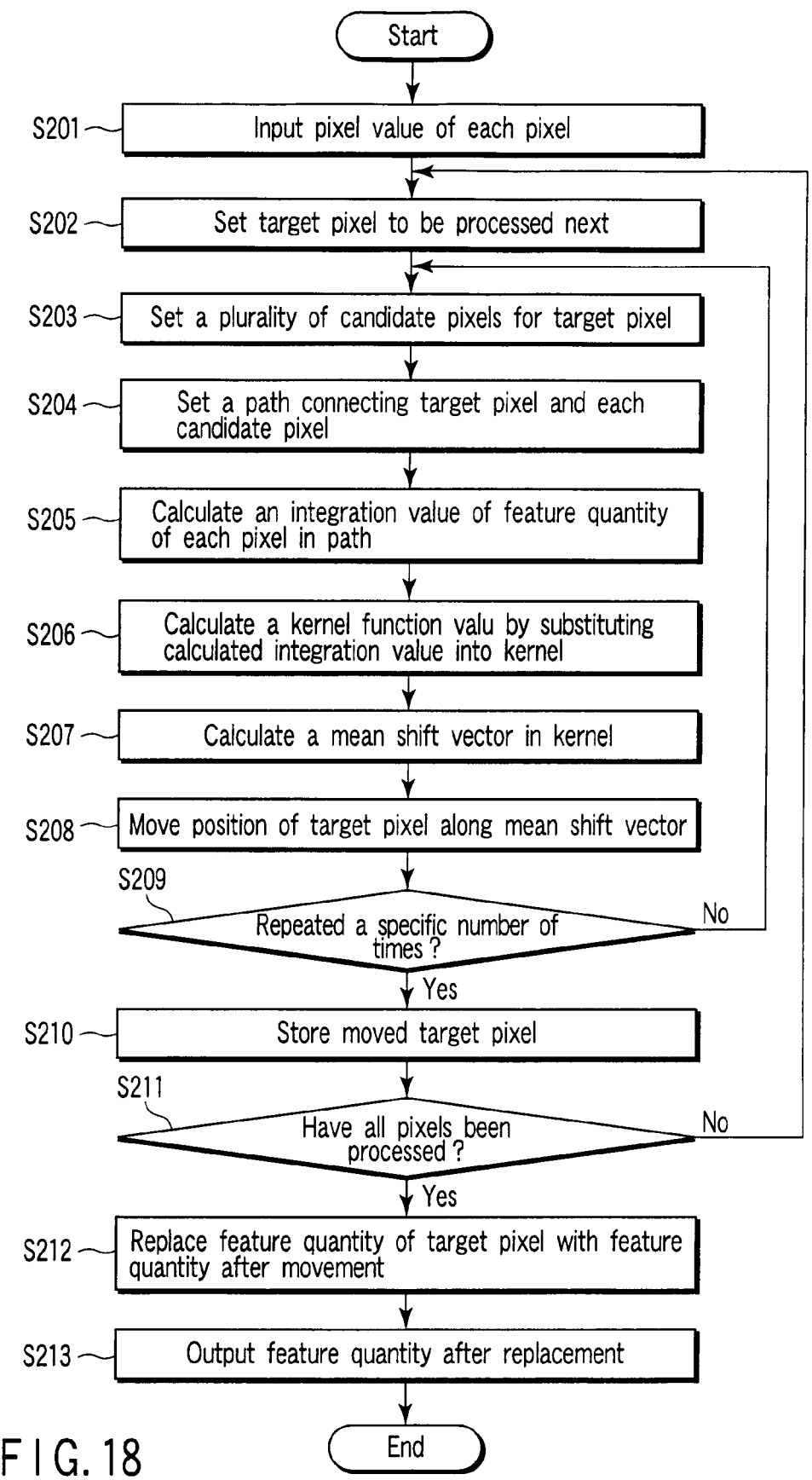
FIG. 18 is a flowchart to help explain the processing sequence in the filter of FIG. 17.

According to the sequence shown in FIG. 18, the individual target pixels converge at several points in the three-dimensional space. Replacing the luminance value in the position of each point at the departure point with the luminance value after the convergence makes it possible to realize a mean shift filter which filters out noise and sharpens edges at the same time. Moreover, allocating a label to each convergent point as described earlier enables the region segmentation of an image (or clustering if the object is not an image).

Various methods of finding a kernel corresponding to the target pixel can be considered. For instance, to find a good kernel in a short processing time, the following method can be used.

First, with the target pixel as a starting point, a straight line is drawn on four sides around (at intervals of 90°) or on eight sides around (at intervals of 45°). With a pixel being an ending point on each straight line, when the first position where equation (2) is not satisfied is found, four or eight points to constitute the boundary of a kernel are obtained. These points to constitute a kernel are connected by segments, thereby forming a kernel. To make the processing time shorter, only the pixels on the segment connecting each starting point and ending point may be set as a kernel. To give greater importance to accuracy than processing time, the number of straight lines drawn with the target pixel as the starting point may be increased. Conversely, when approximation by straight lines is not wanted, for example, the following sequence is used.

Step A1: The target pixel is caused to belong to an unprocessed pixel set (a buffer capable of recording an arrangement of pixel positions). A processed pixel set (a buffer capable of recording an arrangement of pixel positions) is initialized to be empty. An integration value buffer capable of recording an integration value for each pixel.

Step A2: One pixel is taken out of the unprocessed pixel set (the pixel is read and deleted from the unprocessed pixel set) and the pixel (referred to as a pixel being processed) is added to the processed image set.

Step A3: For each of the pixels in four or eight vicinities (referred to as vicinal pixels) being processed, a plurality of added values of the integration value at a pixel recorded in the processed pixel set and an integrand value at a vicinal pixel are calculated. The minimum value of the additional value is regarded as the integration value at each vicinal pixel and recorded in an integration value buffer. If there is a value already recorded in the integration value buffer, it is overwritten. The integrand value is determined using, for example, the following expression (7) or (8):

$$|I(v) - I(X)| \qquad (7)$$

$$\left|\frac{\partial}{\partial v} I(v)\right| \qquad (8)$$

Step A4: The following operation is carried out using four or eight vicinal pixels. If the calculated integration value (which is $r(X, X')/h^2$ at a vicinal pixel and increases monotonically) is not a value that makes $g(r(X, X')/h^2)$ zero (i.e., a value exceeding the radius of the kernel) and is not included in the processed pixel set, the vicinal pixel is added to the unprocessed pixel set. If not, the vicinal pixel is caused to remain unchanged.

Step S5: If the unprocessed pixel set is empty, the process is terminated. If not, control is returned to step A2.

As an example of a case where the dimension of a position in the image space is $\gamma=2$, operations have been carried out on four sides around or eight sides around, with the target pixel as the starting point. The operations are not limited to two dimensions and may be expanded to three or more dimensions ($\gamma$ is 3 or more). For instance, in the three-dimensional space, when operations are carried out at intervals of 90° with the target pixel at the center, they are carried out on six sides around. When operations are carried out at intervals of 45°, they are carried out on 26 sides around.

The image space is not necessarily a uniform space sampled in a reticular pattern, such as an image space obtained with an image pickup apparatus using a typical lens and a camera. For instance, the pixel may be hexagonal. The image may be an image obtained with an image pickup apparatus using a distorted lens (e.g., an omnidirectional sensor). In that case, it is necessary to change the definition of vicinities, such as 4 vicinities or 8 vicinities, according to the shape of a pixel. For example, all the pixels adjacent to the target pixel are defined as vicinities.

While in the embodiment, a kernel of an arbitrary shape has been applied to a mean shift, the application of such a kernel is not limited to this. As explained in the background, mean shift is just only one computational approach of finding a local maximum of the gradient of the density function obtained by kernel density estimation.

Although mean shift has been described first for convenience of explanation, the method of determining the shape of a kernel may be applied to kernel density estimation. For example, in the example of clustering, since only the gradient is estimated in mean shift, it is unknown in mean shift whether the created cluster is a true cluster or a false cluster created by noise. However, when a probability density function value at the convergece position is found by kernel density estimation, if the created cluster is a true cluster, the probability density function value is large. If the created cluster is a false cluster, the probability density function value is small. Therefore, for example, the predetermined threshold value is compared with the probability density function value, which enables clustering. A concrete method of making a kernel density estimation will be described later.

In the above explanation, as an example of the N-dimensional space having $\gamma$-dimensional positions and $\eta$-dimensional feature quantities, an image space having two-dimensional positions and one-dimensional feature quantity (luminance) has been mainly described. As described above, the number of dimensions may be a value other than $\gamma$ and $\eta$. Moreover, the N-dimensional space is not necessarily an image space. When a distance or a quantity corresponding to a distance (e.g., quasi-distance) is defined and there is a space (N-dimensional space) where a point in the space is represented by an N-dimensional (N is 2 or more) vector, the dimensions of the N-dimensional space are divided into two, positions and feature quantities. For example, the above explanation corresponds to a case where N=3, $\gamma=2$ (two-dimensional positions), and $\eta=1$ (one-dimensional feature quantity, luminance). A feature quantity in the N-dimensional space is set as I(v), integration is done from X to X' with the path v as an integral interval as shown in equation (1), and the obtained integration value is substituted as a variable value into a kernel function, thereby determining a kernel function value. Using the kernel function value, a mean shift and kernel density estimation can be performed as described above.

<Kernel Density Estimation>

Figure 19:
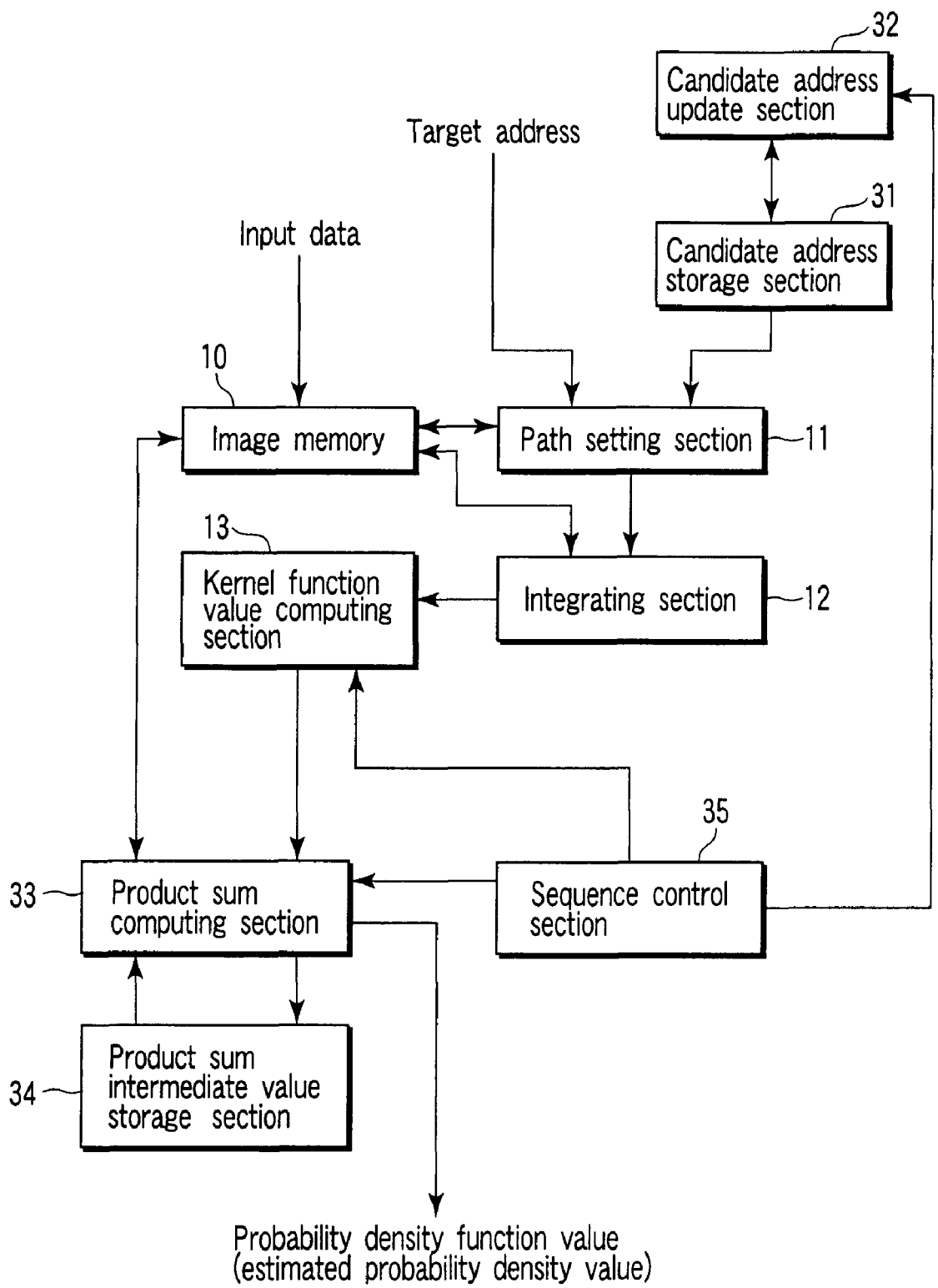
FIG. 19 is a block diagram of a probability density function value computing apparatus according to a third embodiment.

Next, kernel density estimation will be explained. As shown in FIG. 19, a kernel density estimation apparatus according to an embodiment includes not only the data memory 10, path setting section 11, integrating section 12, and kernel unction computing section 13 which are the elements of the kernel function value computing apparatus of FIG. 1 but also a candidate address storage section 31, a candidate address update section 32, a product sum computing section 33, a product sum intermediate value storage section 34, and a sequence control section 35.

Hereinafter, referring to FIG. 20, the sequence of making a kernel density estimation corresponding to a target sample X in the N-dimensional space having $\gamma$-dimensional positions and r-dimensional feature quantities will be described. The sequence of FIG. 20 is controlled by the sequence control section 35.

First, data on all the samples in the N-dimensional space is input as input data and is stored in the data memory 10 (step S301). Moreover, a plurality of target samples X having positions and feature quantities for which a probability density function is wanted are set (step S302). The target sample X may be one of all the samples in the N-dimensional space or an arbitrary vector not belonging to the samples in the N-dimensional space. In FIG. 19, as an example when only a sample belonging to the samples stored in the data memory 10 is set as a target sample X, the address of a target sample (or target address) is given to the path setting section 11. In place of the target address, the vector of the target sample itself may be given to the path setting section 11.

A kernel function value $k(r(X, X')/h^2)$, a weight given to each sample, is calculated according to the method described in the caption <Computing kernel function values>, taking a kernel for the target sample X into account. Specifically, first, a path connecting the target sample X to each candidate sample X' is set (step S304). The setting of a path is done at the path setting section 11, referring to data on the samples in the data memory 10 as needed. For example, all the samples in the N-dimensional space may be used as a candidate sample X'. To speed up the processing, a plurality of samples obtained by sampling all the samples in the N-dimensional space randomly in an equal probability or the samples whose distance from the target sample X in the $\gamma$-dimensional space lies within a preset suitable radius r may be used as a candidate sample X'.

Next, using the path set in step S304 as an integral interval, the integrating section 12 does an definite integration, referring to the data in the data memory 10 as needed, and calculates an integration value r(X, X') (step S305). Then, the kernel function value computing section 13 uses the integration value r(X, X') as a valuable value of a preset kernel function (•), thereby calculating a kernel function value k(r(X, X')/h$^2$) (step S306).

Next, using the kernel function value k(r(X, X')/h$^2$), a kernel density estimation is made, thereby calculating a probability density function f(X) (step S307). If a normalized constant to set a sample arising probability for the entire object space at 1 is Z, a probability density function f(X) is found by the following equation:

$$f(X) = (1/Z) \sum_{i=1}^{n} k(r(X, X')/h^2) \tag{9}$$

Since the shape of the kernel changes according to the target sample X, a normalized constant Z is not easy to calculate unlike a mean shift. However, Z carries no special significance in comparison of gradients or probability densities and therefore frequently need not be found. Moreover, in the determination of the threshold values of clusters described earlier, the value Zf(X) of the following equation may be found for the convergent point of each given sample without finding a normalized constant Z and the value obtained by dividing Zf(X) by a mean value may be compared with the threshold value:

$$Zf(X) = \sum_{i=1}^{n} k(r(X, X')/h^2) \tag{10}$$

The processes in steps S305 to S307 are realized by the product sum computing section 33 doing a product sum calculation, referring to the contents of the product sum intermediate value storage section 34, when, for example, the normalized constant Z is not needed (that is, when Zf(X) in equation (10) is calculated).

Furthermore, even if the gradient of the estimated density function is needed, the processes in steps S301 to S305 may be applied to several points around the target sample X in the N-dimensional space without using, for example, a mean shift and the gradient of the estimated density function may be determined using the obtained points and the least-square method.

The operation of finding an integration value described in a continuous space from discrete observational data is realized as follows. For example, when an integration value r(X, X') is calculated according to equation (3), η-dimensional samples existing on a path defined in γ dimensions are found. The magnitude of the difference in feature quantity between samples adjacent to the η-dimensional samples is determined. The magnitudes of those differences are added up.

On the other hand, when an integration value r(X, X') is calculated according to equation (5), η-dimensional samples existing on a path defined in γ dimensions are found. A value obtained by dividing the magnitude of the difference in feature quantity between samples adjacent to the η-dimensional samples by the length of the path between samples is determined. The determined values are added up. The length of the path between samples is determined in Ln distance (n is the dimension of distance). In other words, the length of the path between samples is determined in, for example, L1 distance (urban distance), L2 distance (Euclidean distance), or L∞distance (chess board distance).

If each given sample is a point in the N-dimensional space, a sample desirable for use in computing an integration value may not have an intersection with the path. When a point on the path is found, provided that each sample has a predetermined shape, for example, a square (including an extra square), a rectangle (including an extra rectangle), or a circle (including an extra circle) in γ dimensions and a size, this problem is less liable to arise.

Since the pass setting in step 104 of FIG. 2, that in step S204 of FIG. 18, and that in step S304 of FIG. 20 do not depend on the results of the other steps, calculations of the individual paths can be done in parallel. In calculating an integration value in step 105 of FIG. 2, in step S205 of FIG. 18, and in step S305 of FIG. 20, an integration value at the next point in the path is a value obtained by adding the difference from the preceding integral value in the path. Accordingly, doing integration by a sequential process makes it possible to reuse the preceding integration value in the path, which reduces the calculation amount. Particularly under the following conditions, the calculation amount can be reduced remarkably:

(Condition 1) The object space is an image space or a space which can be treated equally as an image (a space where samples are arranged at lattice points in dimensions of position).

(Condition 2) In mean shift, the profile g(x) is limited to an Epanechnikov profile. In kernel density estimation, the kernel function k(x) is limited to a Uniform kernel ( ). The form of a Uniform kernel is shown in the following equation. An Epanechnikov profile has completely the same form:

$$k(x) = \begin{cases} 1 & \text{if } |x| < 1 \\ 0 & \text{otherwise} \end{cases} \tag{11}$$

In equation (11), constant 1 at two places may be another constant.

(Condition 3) A path to determine the shape of a kernel is a straight line with a given point as the starting point.

(Condition 4) An integration value is given by the sum total of the magnitude of the difference in feature quantity between adjacent samples (pixels) on a straight line, that is, is given by equation (5).

When these four conditions are satisfied, the calculation of the integration value can be speeded up in calculating a kernel function value corresponding to a mean shift and kernel density estimation on the basis of the embodiment. Particularly when the integration value used in the preceding adjacent pixel in the scanning direction exists, the integration value at the target pixel can be calculated at high speed. Specifically, the integration value at the target pixel is calculated sequentially by, for example, the following method:

Step B1: A set in the straight line direction is initialized according to the definition of "vicinities" described above. For example, if the coordinates of width W, height H, and position are in four vicinities of an image represented by (x, y), the straight-line direction set is {(1, 0), (0, 1), (−1, 0), (0, −1)}.

Step B2: One straight-line direction is taken out of the straight-line direction set initialized in step B and is set as a straight-line direction to be processed next.

Step B3: All the sets of points serving as dead ends (referred to as end-point sets) on the image when scanning is done in the straight-line direction in the middle of processing are found. For example, an end-point set when the straight-line direction is a (1, 0) direction, that is, a set of the starting point and ending point, is determined to be {(0, j), (W−1, j)} (j is an integer).

Step B4: One set is taken out of the end-point sets. Hereinafter, let its starting point be A and its ending point be B.

Step B5: let a target pixel be A. Let end-points (pixel positions) of a kernel be C and D. A is set to C and D. Here, C represents the end-point on the starting-point side of the kernel and D represents the end-point on the ending-point side of the kernel. Let the integration values of C and D be 0.

Step B6: An integration value when a path is set between A and Anext for a pixel next to the target pixel A (an adjacent pixel in the straight-line direction in the middle of processing, hereinafter, referred to as Anext), that is, an integrand value in equation (7) or equation (8) at Anext, is determined. The integrand value at Anext is subtracted from the integration values at C and D.

Step B7: For a pixel next to D (referred to as Dnext), an integrand value at Dnext is determined. If the integration value of D is positive and exceeds the threshold value that zeros the value of the kernel which uses the value obtained by adding the integrand value at Dnext to the integration value of D as a variable value, control proceeds to the next step B8. If not, D is replaced with Dnext and the integrand value at Dnext is added to the integration value of D and control is returned to step B7. If Dnext exceeds B, step B7 is skipped.

Step B8: If the integration value of C is not negative or the value of the kernel which uses the integration of C as a variable value is not 0, control proceeds to step B9. If not, the integrand value of a pixel next to C (referred to as Cnext) is determined and the resulting value is subtracted from the integration value of C. Thereafter, C is replaced with Cnext and step B8 is repeated.

Step B9: C and D are recorded as a range of a Uniform kernel in the straight-line direction in the middle of processing the target pixel A.

Step B10: The processes in steps B6 to B9 are repeated until the target pixel has reached B.

Step B11: Steps B4 to B10 are repeated until the end-point set has become empty.

Step B12: Steps B2 to B11 are repeated until the straight-line direction set has become empty.

By the above sequence, the range of the Uniform kernel for all the pixels in the image can be determined at high speed (when end-points are set in step B3 so that all the pixels at the image become A). If the range of the Uniform kernel in the pixels in a region of interest is wanted instead of all the pixels in the image, the sequence goes as follows. In step B5, a first pixel is set as the value of A and D in the straight-line direction being processed in a region of interest. In step B10, changing is done in such a manner that the processes in steps B6 to B9 are repeated until the last pixel has been reached in the region of interest in the straight-line direction, not B.

By the above-described method, it is possible to suppress excessive integration and excessive segmentation occurred in a conventional mean shift in clustering or region segmentation. Estimating the value of the probability density function by kernel density estimation makes it possible to make a threshold value determination of clusters and noise, which enables noise to be filtered out.

<Regional Fitting>

The kernel density estimation using a kernel of an arbitrary shape in the embodiment may be applied to not only clustering and region segmentation but also regional fitting for an image. For instance, when there is an image obtained by photographing such a subject as a character and a region where a subject exists in the image (a subject region) and the other region (background region) are roughly known, the operation of separating the subject region and the background region is called region fitting. Here, the schematically shown subject region and background region are referred to as an initial subject region (an initial first region) and an initial background region (an initial second region), respectively. Information to distinguish these regions is referred to as initial region information.

In region fitting, an image and initial region information corresponding to the image are input and the corrected (or fitted) region information is output. Suppose each of the initial region information and the corrected region information is represented by a binary mask (an initial binary mask and a corrected binary mask) that allocates binary 1 to a pixel of the image if the pixel is in the subject region and binary 0 to a pixel of the image if the pixel is in the background region.

As in the region segmentation, a vector where positions and a pixel value (luminance value) are arranged is considered. By either the conventional kernel density estimation or the kernel density estimation using a kernel of an arbitrary shape according to the embodiment, whether the target pixel belongs to the subject or the background can be estimated according to the following three steps when the target pixel is set in the image.

Step C1: In a space where only the pixels determined to be in the subject region in the initial region information exist, kernel density estimation is applied to the target pixel. At this time, a probability density function to which the position and pixel value of the target pixel are input and which outputs probability density is obtained. The position and pixel value of the target pixel are input to the probability density function, thereby obtaining an estimated value of the probability density function value belonging to the subject region.

Step C2: Taking into account a space where only the pixels determined to be in the background region in the initial region information exist, the same process as in step C1 is carried out, thereby obtaining an estimated value of the probability density function value belonging to the background region.

Step C3: The estimated values of the two probability density function values obtained in steps C1 and C2 are compared with each other and it is presumed that the target pixel belongs to the region whose estimated value is larger. Specifically, if the estimated value of the probability density function value belonging to the subject region is larger, it is assumed that the target pixel belongs to the subject region. If the estimated value of the probability density function value belonging to the background region is larger, it is assumed that the target pixel belongs to the background region.

If the processes in the three steps C1, C2, and C3 are applied as target pixels to the entire screen or all the pixels in a part of the image, region fitting can be done. In this case, since only a relative value of the estimated value of the probability density function is meaningful, the normalized constant Z need not be considered. For example, the normalized constant Z is set at Z=1.

Figure 21:
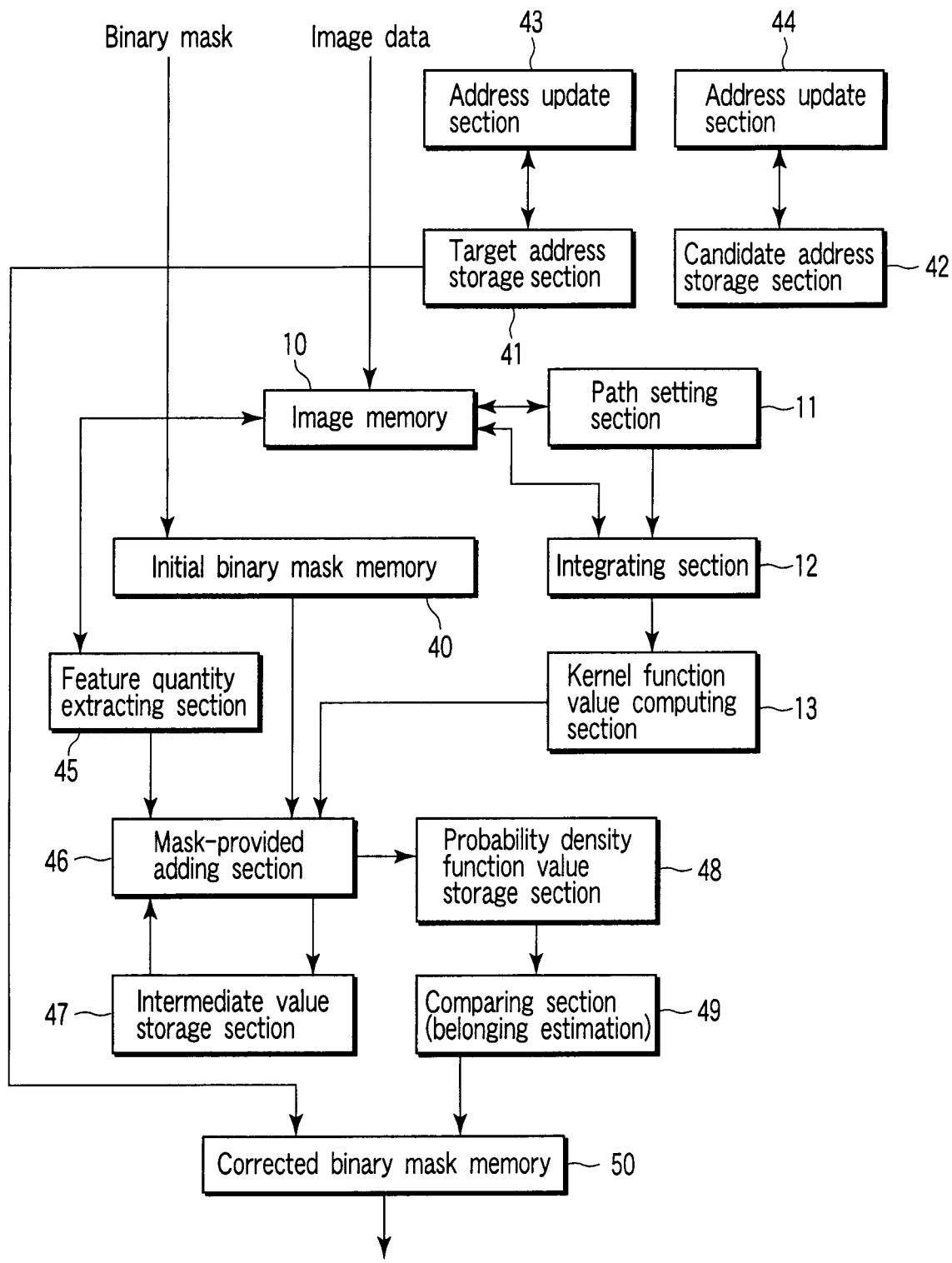
FIG. 21 is a block diagram of a region fitting apparatus according to a fourth embodiment.

FIG. 21 shows a region fitting apparatus according to an embodiment based on the above-described principle. The region fitting apparatus includes not only the data memory (here, image memory) 10, path setting section 11, integrating section 12, and kernel function value computing section 13 which are the same elements as those of the kernel function value computing apparatus shown in FIG. 1 but also an initial binary mask 40, a target address storage section 41, a candidate address storage section 42, a target address update section 43, a candidate address update section 44, a feature quantity extracting section 45, a mask-provided adding section 46, an intermediate value storage section 47, a probability density function value storage section 48, a comparing section 49, and an output binary mask memory 50.

Figure 22:
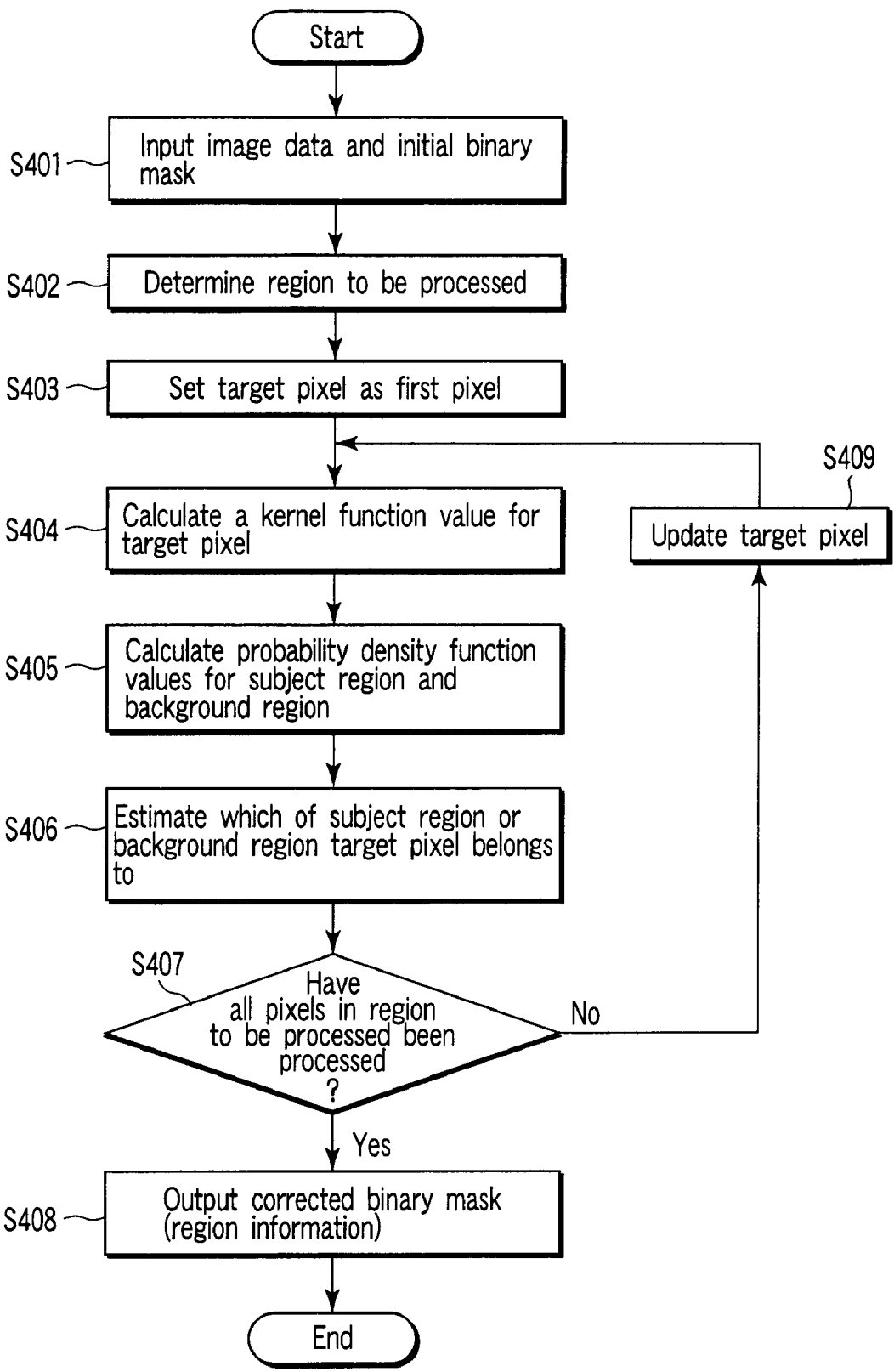
FIG. 22 is a flowchart to help explain the processing sequence in the apparatus of FIG. 21.

Hereinafter, referring to FIG. 22, the sequence of doing region fitting will be described. First, image data and an initial binary mask are input (step S401) and stored in the image memory 10 and binary mask memory 40. A region to be subjected to region fitting is determined in the image (step S402). The region to be subjected to region fitting (or the region to be processed) may be the entire screen of the image or only the vicinity of the pixels where the value changes from 1 to 0 or vice versa in, for example, an initial binary mask. The region to be processed is used when the address update section 43 updates the address of the target pixel (or target address) stored in the target address storage section 41. When the region to be processed is the entire screen of the image, the target address is updated in order of raster. When the region to be processed is a part of the screen, the contents of a region-to-be-processed storage section (not shown) connected to the address update section 43 are set according to the input image data and the contents of the region-to-be-processed storage section are referred to in updating the target address.

The target pixel is set to the first pixel in the region to be processed (e.g., the first pixel in order of raster in the region to be processed) (step S403). This setting is done by updating the target address (the address of the target pixel) stored in the target address storage section 41. Then, while the address update section 44 is updating the candidate address (the address of a candidate pixel) stored in the candidate address storage section 42, the path setting section 11, integrating section 12, and kernel function value computing section 13 calculates the shape of a kernel for the target pixel, that is, a kernel function value (step S404). A kernel function value is calculated for all the pixels, that is, without using a binary mask of the subject region, while updating the candidate address according to the sequence explained in the caption <Computing kernel function values>.

Next, a probability density function value is estimated (step S405). In step S405, referring to the initial binary mask stored in the binary mask 40, the mask-provided adding section 46 and intermediate value storage section 47 do addition with a mask, that is, add the feature quantities in the kernel whose shape has been determined by the kernel function for each subject region and each background region, thereby calculating a probability density function value belonging to the subject region and a probability density function value (estimated value) belonging to the background region. The calculated probability density function value belonging to the subject region and the calculated probability density function value belonging to the background region are stored in the storage section 48.

Next, the probability density function value belonging to the subject region and the probability density function value belonging to the background region stored in the storage section 48 are compared at the comparing section 49, thereby estimating whether the target pixel belongs to the subject region or the background region and outputting region information indicating which region the target pixel belongs to (step S406). The processes in steps S404 to S406 are repeated, while updating the target pixel in, for example, order of raster, until the processes have been carried out on all the pixels in the region to be processed (steps S407 to S408). The region information is stored in the output binary mask memory 50. After all the pixels in the region to be processed have been processed and region information for all the pixels has been obtained, the region information is output as a binary mask via the corrected binary mask memory 50 (step S409).

Figure 23:
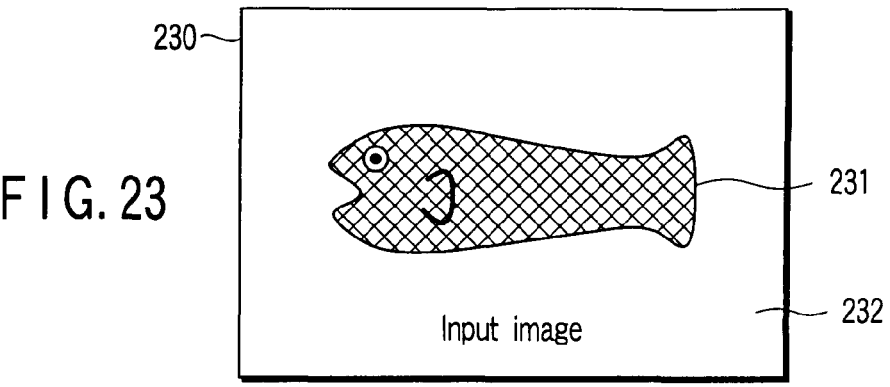
FIG. 23 shows an image input to the apparatus of FIG. 21.
Figure 24:
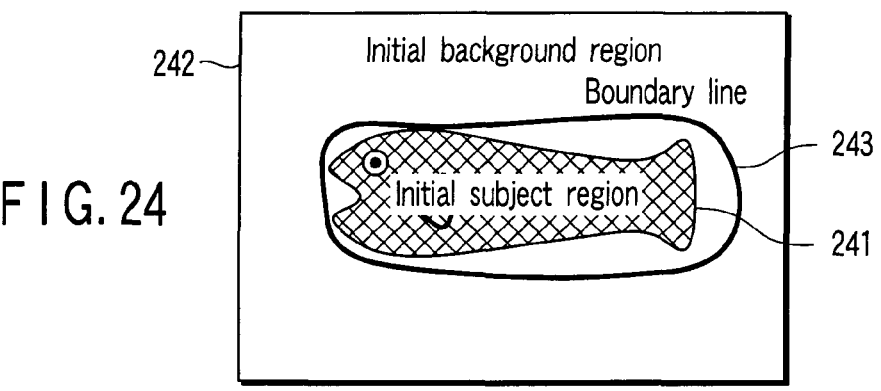
FIG. 24 is a diagram to help explain initial region information input to the apparatus of FIG. 21 according to the image of FIG. 23.
Figure 25:
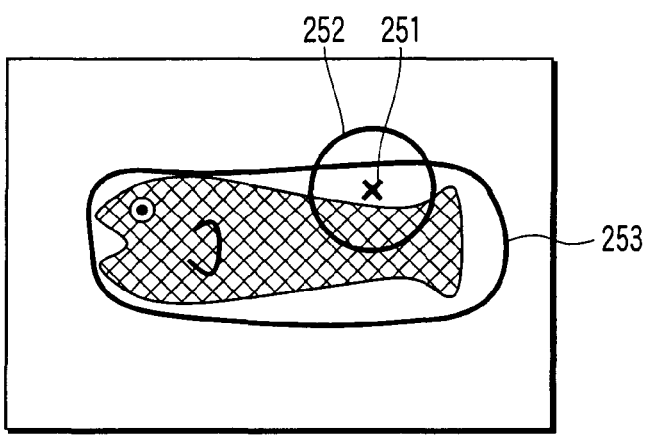
FIG. 25 shows an example of applying a circular kernel corresponding to the target pixel to the image of FIG. 23.
Figure 26:
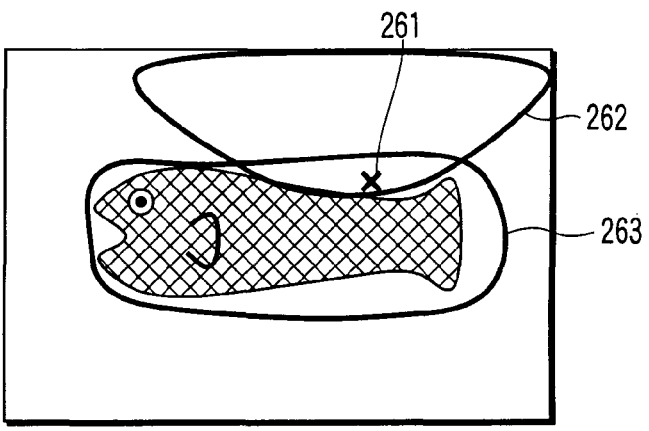
FIG. 26 shows an example of applying a kernel formed according to the embodiment corresponding to the target pixel to the image of FIG. 23.

In the region fitting according to the embodiment, an example superior to a case where a convectional circular kernel was used will be explained. Consider a case where an image having a subject 231 and a background 232 which has two-dimensional positions and one-dimensional feature quantity (pixel value) as shown in FIG. 23 and initial region information to distinguish an initial subject region 241 and an initial background region 242 as shown in FIG. 24 corresponding to FIG. 23 by a boundary line 243 have been input. Let the target pixel in the image of FIG. 23 be 251 in FIG. 25 or 261 in FIG. 26. In FIGS. 25 and 26, boundary lines 253 and 263 are drawn so as to correspond to the boundary line 243 in FIG. 24. As shown in FIGS. 25 and 26, the target pixels 251 and 261 are expected to be determined to be in the background region.

Conventionally, a circular kernel 252 (although it is two-dimensional in FIG. 25, it is actually a three-dimensional sphere) is set for the target pixel 251 as shown in FIG. 25. Here, the initial subject region 241 in FIG. 24 is closer to the target pixel and has a larger region than the white region of the circular kernel 252. Therefore, since the probability density function value of the subject region is larger in the estimated value of the probability density function value, the target pixel 251 is determined to be in the subject region, although it is in the background region.

However, according to the above described embodiment, as shown in FIG. 26, a kernel 262 where the initial background region 242 in FIG. 24 has a larger area for the target pixel 261 is set. Accordingly, the target pixel 261 is correctly determined to be in the background region. As described above, the embodiment enables errors in the determination of regions to be decreased when region fitting is done, which makes it possible to obtain a highly reliable result. The reason is that the shape of the kernel is not fixed but is adaptively set so as to reflect the shape of the subject region and background region of the image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image filtering method comprising:
    setting a path connecting a first pixel of an arbitrary N-dimensional vector (N is a natural number) to a plurality of second pixels in an N-dimensional space having $\gamma$-dimensional positions and an $\eta$-dimensional feature quantity ($\gamma$ is a natural number equal to 2 or more and n is a natural number equal to 1 or more);
    obtaining an integration value by integrating the feature quantity on the path;
    calculating a kernel function value corresponding to the first pixel using the integration value as a variable value of a preset kernel function;
    calculating a mean shift vector by dividing the sum of products of the kernel function value and the feature quantities of the second pixels by the sum total of the kernel function values;
    moving the first pixel according to the mean shift vector; and
    replacing the feature quantity of the first pixel with the feature quantity of the moved first pixel.

2. The method according to claim 1, wherein the integration value is the sum total of the difference between the feature quantity of the first pixel and each of the feature quantities of the individual pixels existing at a plurality of positions set on the path.

3. The method according to claim 1, wherein the integration value is the sum total of the difference between the feature quantities of adjacent pixels existing at a plurality of positions set on the path.

4. The method according to claim 1, wherein the kernel function is a normal distribution function.

5. The method according to claim 1, wherein the kernel function is a function which, if the variable value exceeds a predetermined value, outputs 0 and, if not, outputs a predetermined constant.

6. An image clustering method comprising:
setting a path connecting a first pixel of an arbitrary N-dimensional vector (N is a natural number) to a plurality of second pixels in an N-dimensional space having γ-dimensional positions and an η-dimensional feature quantity (γ is a natural number equal to 2 or more and η is a natural number equal to 1 or more);
obtaining an integration value by integrating the feature quantity on the path;
calculating a kernel function value corresponding to the first pixel using the integration value as a variable value of a preset kernel function;
calculating a mean shift vector by dividing the sum of products of the kernel function value and the feature quantities of the second pixels by the sum total of the kernel function values;
moving the first pixel according to the mean shift vector;
replacing the feature quantity of the first pixel with the feature quantity of the moved first pixel; and
allocating the same cluster to a plurality of pixels whose similarity of feature quantity is equal to or higher than a predetermined threshold value among the moved first pixels.

7. The method according to claim 6, wherein the integration value is the sum total of the difference between the feature quantity of the first pixel and each of the feature quantities of the individual pixels existing at a plurality of positions set on the path.

8. The method according to claim 6, wherein the integration value is the sum total of the difference between the feature quantities of adjacent pixels existing at a plurality of positions set on the path.

9. The method according to claim 6, wherein the kernel function is a normal distribution function.

10. The image clustering method according to claim 6, wherein the kernel function is a function which, if the variable value exceeds a predetermined value, outputs 0 and, if not, outputs a predetermined constant.

11. An image region fitting method comprising:
obtaining an image composed of a plurality of pixels having two-dimensional positions and a one-dimensional feature quantity;
setting an initial first region and an initial second region schematically showing a subject region and a background region respectively in the image;
setting a path connecting a first pixel of an arbitrary N-dimensional vector (N is a natural number) to a plurality of second pixels in the image;
obtaining an integration value by integrating the feature quantity on the path;
calculating a kernel function value corresponding to the first pixel using the integration value as a variable value of a preset kernel function;
obtaining a first probability density function value by adding a first kernel function value at each pixel belonging to the initial first region among the kernel function values;
obtaining a second probability density function value by adding a second kernel function value at each pixel belonging to the initial second region among the kernel function values;
comparing the first probability density function value and the second probability density function value and obtaining region information indicating which of the subject region and background region a target pixel set to a pixel in at least a part of the image belongs to; and
outputting the region information.

12. The method according to claim 11, wherein the integration value is the sum total of the difference between the feature quantity of the first pixel and each of the feature quantities of the individual pixels existing at a plurality of positions set on the path.

13. The method according to claim 11, wherein the integration value is the sum total of the difference between the feature quantities of adjacent pixels existing at a plurality of positions set on the path.

14. The method according to claim 11, wherein the kernel function is a normal distribution function.

15. The method according to claim 11, wherein the kernel function is a function which, if the variable value exceeds a predetermined value, outputs 0 and, if not, outputs a predetermined constant.

16. An image mean shift filter comprising:
a setting section which sets a path connecting a first pixel of an arbitrary N-dimensional vector (N is a natural number) to a plurality of second pixels in an N-dimensional space having γ-dimensional positions and an η-dimensional feature quantity (γ is a natural number equal to 2 or more and η is a natural number equal to 1 or more);
an integrating section which obtains an integration value by integrating the feature quantity on the path;
a first computing section which calculates a kernel function value corresponding to the first pixel using the integration value as a variable value of a preset kernel function;
an extracting section which extracts the feature quantities of the second pixels;
a storage section which stores the feature quantity;
a second computing section which calculates a mean shift vector by dividing the sum of products of the kernel function value and each of the feature quantities of the second pixels by the sum total of the kernel function values; and
a replacing section which moves the first pixel according to the mean shift vector and replaces the feature quantity of the first pixel with the feature quantity of the moved first pixel.

17. A region fitting apparatus comprising:
an obtaining section which obtains an image composed of a plurality of pixels having two-dimensional positions and a one-dimensional feature quantity;
a first setting section which sets an initial first region and an initial second region schematically showing a subject region and a background region respectively in the image;
a second setting section which sets a path connecting a first pixel of an arbitrary N-dimensional vector (N is a natural number) to a plurality of second pixels in the image;
an integrating section which obtains an integration value by integrating the feature quantity on the path;

a first computing section which calculates a kernel function value corresponding to the first pixel using the integration value as a variable value of a preset kernel function;

a first adding section which obtains a first probability density function value by adding a first kernel function value at each pixel belonging to the initial first region schematically showing the subject region of the image among the kernel function values;

a second adding section which obtains a second probability density function value by adding a second kernel function value at each pixel belonging to the initial second region schematically showing the background region of the image among the kernel function values;

a comparing section which compares the first probability density function value and the second probability density function value and obtains region information indicating which of the subject region and background region a target pixel set to a pixel in at least a part of the image belongs to; and an output section which outputs the region information.

* * * * *